Figures 1, 2:
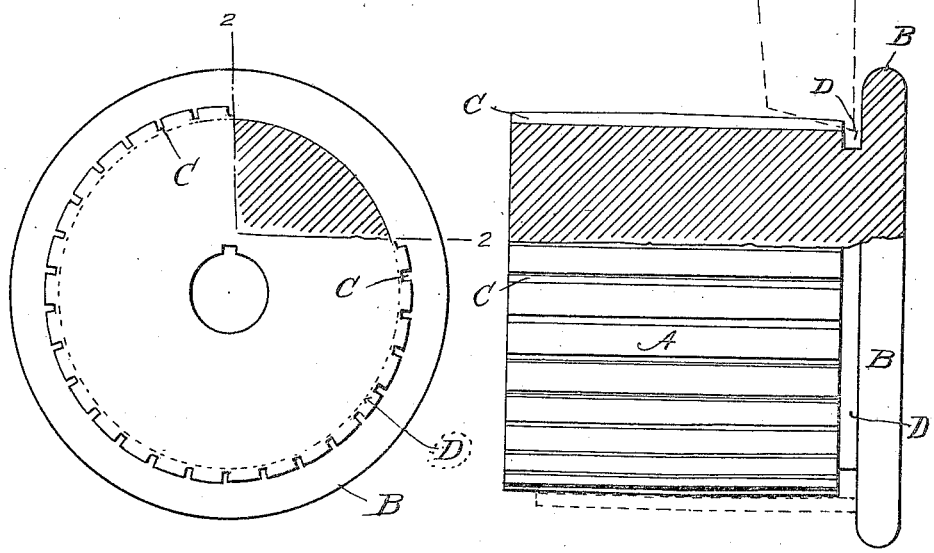

H. M. PLAISTED.
FLANGED PULLEY.
APPLICATION FILED MAR. 8, 1920.

1,430,752.

Patented Oct. 3, 1922.

Inventor
Harold M. Plaisted

Patented Oct. 3, 1922.

1,430,752

UNITED STATES PATENT OFFICE.

HAROLD M. PLAISTED, OF ST. LOUIS, MISSOURI, ASSIGNOR OF FORTY-NINE ONE-HUNDREDTHS TO MILTON F. WILLIAMS, OF ST. LOUIS, MISSOURI.

FLANGED PULLEY.

Application filed March 8, 1920. Serial No. 364,351.

*To all whom it may concern:*

Be it known that I, HAROLD M. PLAISTED, a citizen of the United States, residing at St. Louis, State of Missouri, have invented certain new and useful Improvements in Flanged Pulleys, of which the following is a specification.

This invention relates to certain new and useful improvements in flange pulleys the peculiarities of which will be hereinafter fully described and claimed.

The main object of my invention is to provide a flange pulley that can be readily cross-grooved on its face; second to provide a flange pulley that affords a continuous circumferential air passage next to the flange for air outlet of cushioned air, either alone or in connection with cross passages on the face of said pulley that communicate at their ends with the circumferential outlet passage.

In the accompanying drawing on which like reference letters indicate corresponding parts, Fig. 1 represents an end view of a pulley embodying my invention with a portion broken away; and Fig. 2 a face view of said pulley partly in section on the line 2—2 of Fig. 1.

It has been demonstrated that cross grooving the face of a pulley increases the adhesion of the belt to the pulley and largely does away with the cushioned air between the belt and the pulley. In applying this improvement to the face of a flanged pulley, the slotting tool requires an opening at the inner end of its stroke, otherwise each successive cut reduces the length of the cut as the point of the tool stops short of the end of the stroke. It is to overcome this difficulty that is one of the objects of my invention. Referring to the drawing, the letter A designates a pulley face having a flange B. It is desired to groove the face of this pulley by cross grooves such as shown at C, but before grooving the face I form a circumferential groove D, next to the flange in the face of the pulley and preferably radially deeper than the depth of the grooves C. The slotting tool therefore, in forming the grooves C, will end its stroke in the groove D, and clear the grooves from the shavings, as the point of the tool passes from the groove C into the circumferential groove D as indicated by dashed lines in Fig. 2. A clean cut groove C is thus formed in multiple in the face A of said pulley.

It is preferred to make the radial depths of the groove D considerably greater than that of the cross groove C. This is in order to provide for the outlet of the cushioned air at the flange side of the pulley, when the belt crowds over against the inner face of the flange as indicated by dotted lines in Fig. 2 at the lower edge of the face. The cross grooves communicate at their ends with the circumferential groove D which forms a continuous air passage around practically half the circumference of the pulley with open ends, even when the belt is running close to the inner face of the flange B. The opposite ends of the cross grooves likewise allow exit of the cushioned air from the opposite side of the pulley.

While I have shown a pulley with one flange, my improved groove D may be used on a pulley having two flanges.

The cross grooves C are formed substantially parallel to the central axis of the rotation of the pulley, and in a crowned face pulley are deeper in the middle of the pulley than at the ends. The cushioned air between the belt and pulley is at its maximum density in the middle plane of the belt and pulley where the cross grooves C are deepest and receive and discharge the cushioned air into the connecting annular groove at the flange of the pulley, and also out the opposite ends of the grooves.

I claim:

A crown faced pulley having a flange at one side, the said crown face having a series of spaced cross grooves substantially parallel to the axis of rotation and deeper in the middle than at the ends of the groove, and an annular groove adjacent to said flange and radially deeper than said cross grooves.

In testimony whereof I have affixed my signature.

HAROLD M. PLAISTED.